(12) United States Patent
Asho et al.

(10) Patent No.: US 7,715,851 B2
(45) Date of Patent: May 11, 2010

(54) SYSTEM AND METHOD FOR LOCATING WIRED NETWORKS USING WIRELESS DATA

(75) Inventors: Junichi Asho, Tokyo (JP); Joseph Robert Parker, Hillsborough, NC (US); Ratan Ray, Durham, NC (US); Victor Rios, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1029 days.

(21) Appl. No.: 10/741,711

(22) Filed: Dec. 19, 2003

(65) Prior Publication Data

US 2005/0136941 A1   Jun. 23, 2005

(51) Int. Cl.
*H04W 24/00* (2009.01)

(52) U.S. Cl. .............. 455/456.1; 455/404.2; 455/414.2; 455/422.1

(58) Field of Classification Search .............. 455/456.1, 455/414.2, 418, 460, 433, 432.1, 422.1, 404.2; 370/310

See application file for complete search history.

(56) References Cited

U.S. PATENT DOCUMENTS

| | | | | |
|---|---|---|---|---|
| 5,581,261 A | | 12/1996 | Hickman et al. | 342/385 |
| 5,611,050 A | | 3/1997 | Theimer et al. | 395/200.09 |
| 5,635,940 A | | 6/1997 | Hickman et al. | 342/389 |
| 5,642,303 A | | 6/1997 | Small et al. | 364/705.05 |
| 5,910,799 A | | 6/1999 | Carpenter et al. | 345/333 |
| 6,119,186 A | | 9/2000 | Watts et al. | 710/104 |
| 6,327,623 B2 | | 12/2001 | Watts | 709/229 |
| 6,591,306 B1 | * | 7/2003 | Redlich | 709/245 |
| 6,922,723 B1 | * | 7/2005 | Sharp et al. | 709/221 |
| 7,136,645 B2 | * | 11/2006 | Hanson et al. | 455/435.1 |
| 2001/0003835 A1 | | 6/2001 | Watts | 709/318 |
| 2002/0038387 A1 | | 3/2002 | Fuiks et al. | 709/313 |
| 2002/0194468 A1 | | 12/2002 | Betts-LaCroix et al. | 713/100 |
| 2004/0092269 A1 | * | 5/2004 | Kivinen | 455/456.1 |
| 2004/0111494 A1 | * | 6/2004 | Kostic et al. | 709/220 |
| 2004/0142686 A1 | * | 7/2004 | Kirkup et al. | 455/420 |
| 2004/0203684 A1 | * | 10/2004 | Jokinen et al. | 455/418 |
| 2004/0235464 A1 | * | 11/2004 | Korkalo et al. | 455/418 |
| 2005/0037775 A1 | * | 2/2005 | Moeglein et al. | 455/456.1 |
| 2005/0147058 A1 | * | 7/2005 | Tarnanen et al. | 370/310 |

FOREIGN PATENT DOCUMENTS

GB   2360914 A   10/2001

* cited by examiner

*Primary Examiner*—Charles N Appiah
*Assistant Examiner*—Kwasi Karikari
(74) *Attorney, Agent, or Firm*—VanLeeuwen & VanLeeuwen; Carlos Munoz-Bustamante

(57) ABSTRACT

A system and method is provided for using a wireless network to determine a device's physical location and retrieve location specific settings based upon the device's physical location. A device's physical location is determined by matching the identifier of the wireless access point (WAP) to which the device is connected with a list of WAP identifiers and corresponding location identifiers. The retrieved location identifier is then used to retrieve location specific settings that are applied at the device.

18 Claims, 6 Drawing Sheets

SYSTEM AND METHOD FOR LOCATING WIRED NETWORKS USING WIRELESS DATA

BACKGROUND OF THE INVENTION

1. Technical Field

The present invention relates in general to a system and method for identifying a location based upon a wireless network connection identifier.

2. Description of the Related Art

In current modern network environments, both wireless and wired networks are deployed for the same computing devices. In addition, workers are becoming increasingly mobile using equipment, such as laptop computers, that are easily portable yet easily connected to these wireless and wired networks.

Workers may move within an organization, such as floors of an office building, between buildings occupied by their company, or to different offices in different cities. When a worker moves between locations, many device settings ideally remain constant (such as display attributes, file locations), however other device settings are location specific. One example of a location specific setting is a network accessible printer.

When a user moves from one location, say building "A," to another location, say building "B," and wishes to use location specific settings, such as printers, the user is often relegated to manually adjusting these settings. If the user forgets to change these settings, he or she often discovers that the user's printouts are being printed on a printer in a different location, rather than the printer that is at the user's current location. This problem is exacerbated when the user routinely moves between locations, causing the user to remember each time to change the user's location specific settings, such as the user's default printer.

What is needed, therefore, is a system and method for using a user's wireless network connection to identify the user's physical location so that location specific settings can be set accordingly. Furthermore, what is needed is a system and method for capturing location specific settings so that, upon subsequently entering the location, the location specific settings will automatically be applied at the user's devices.

SUMMARY

It has been discovered that the aforementioned challenges are addressed using a system and method that uses a wireless network to determine a device's physical location and retrieves location specific settings based upon the device's physical location. A device's physical location is determined by matching the identifier of the wireless access point (WAP) to which the device is connected with a list of WAP identifiers and corresponding location identifiers. The retrieved location identifier is then used to retrieve location specific settings that are applied at the device.

When a user changes settings on the device, a determination is made as to whether the changes are global or local in nature. If the changes are location specific, then the location identifier is retrieved based upon the device's WAP identifier and the location specific settings are associated with the location identifier and stored in the location specific settings data store. On the other hand, if the changes are not local in nature, then the settings are stored in a global settings area and for retrieval and application at the device regardless of the location of the device.

For example, suppose a user uses "printer A" as the default printer when in a first location and "printer B" as the default printer when in a second location. When moving between locations, wireless access point to which the user's device is connected is used to identify whether the user is in the first or second location. If the user is in the first location, the system automatically changes the user's default printer to "printer A" and if the user is in the second location, the system automatically changes the user's default printer to "printer B." In this manner, the user can move between locations and use the default printer from within applications and have the printouts sent to a nearby printer rather than to a printer in a different location.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
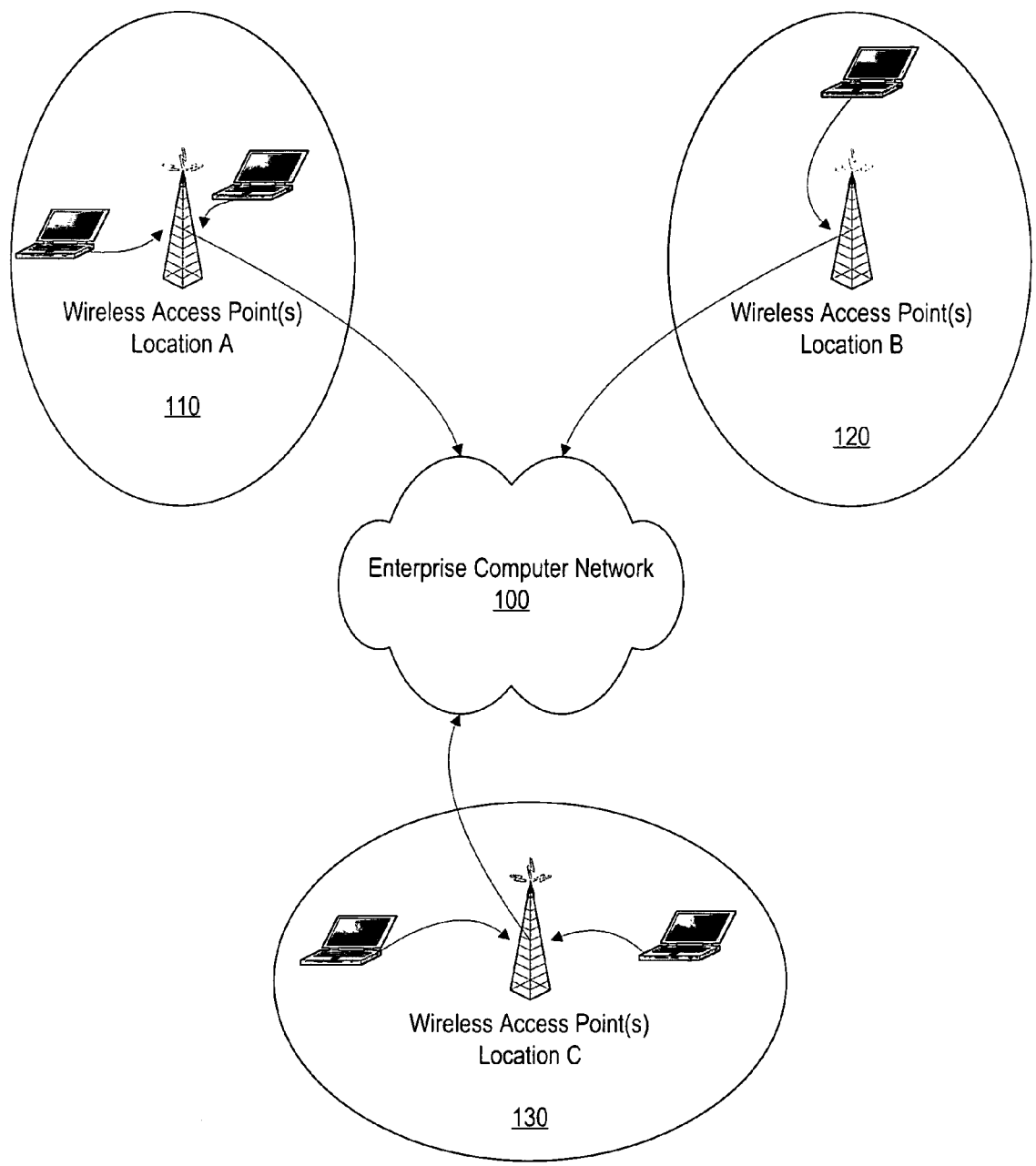
FIG. 1 is a network diagram showing users connected to various wireless access points located throughout an enterprise.

FIG. 1 is a network diagram showing users connected to various wireless access points located throughout an enterprise. In the example shown, the enterprise has three wireless access point locations: location A (110), location B (120), and location C (130). The wireless access locations are interconnected through enterprise computer network 100 which connects computers and other devices throughout the organization. Client devices are often connected to the enterprise computer network through both a wireless access point as well as through a wired interface (i.e., an Ethernet cable attaching the client device to a router or switch which is connected to other network devices, such as bridges, other switches, and other routers, to create the enterprise computer network. When a client is attached to the network, the address identifier assigned to the client device is one or more Internet Protocol (IP) addresses that are uniquely assigned to the client device. When the client device is attached to enterprise computer network 100 through both a wired and wireless interface, two IP addresses are assigned to the client device—one corresponding to the wired interface and the other corresponding to the wireless interface.

When a wireless interface is used, the client device receives an IP address through a wireless access point (WAP) device that wirelessly connects the client device to the rest of the network. As used herein, a WAP device includes a stand alone wireless access point that is connected to a switch or router, as well as a wireless access point that is integrated with a router, as well as any other ways of wirelessly connecting the client with the rest of the network.

Using the wireless interface also provides the client device with an identifier that corresponds to the particular WAP device to which the client is connected. Because of limitations of wireless technology, the client device needs to be within a certain range of the WAP device in order to make a connection. By keeping track of the WAP device identifiers and their respective locations, the relative physical location of the client device can be ascertained based upon the address of the WAP device to which it is connected.

Figure 2:
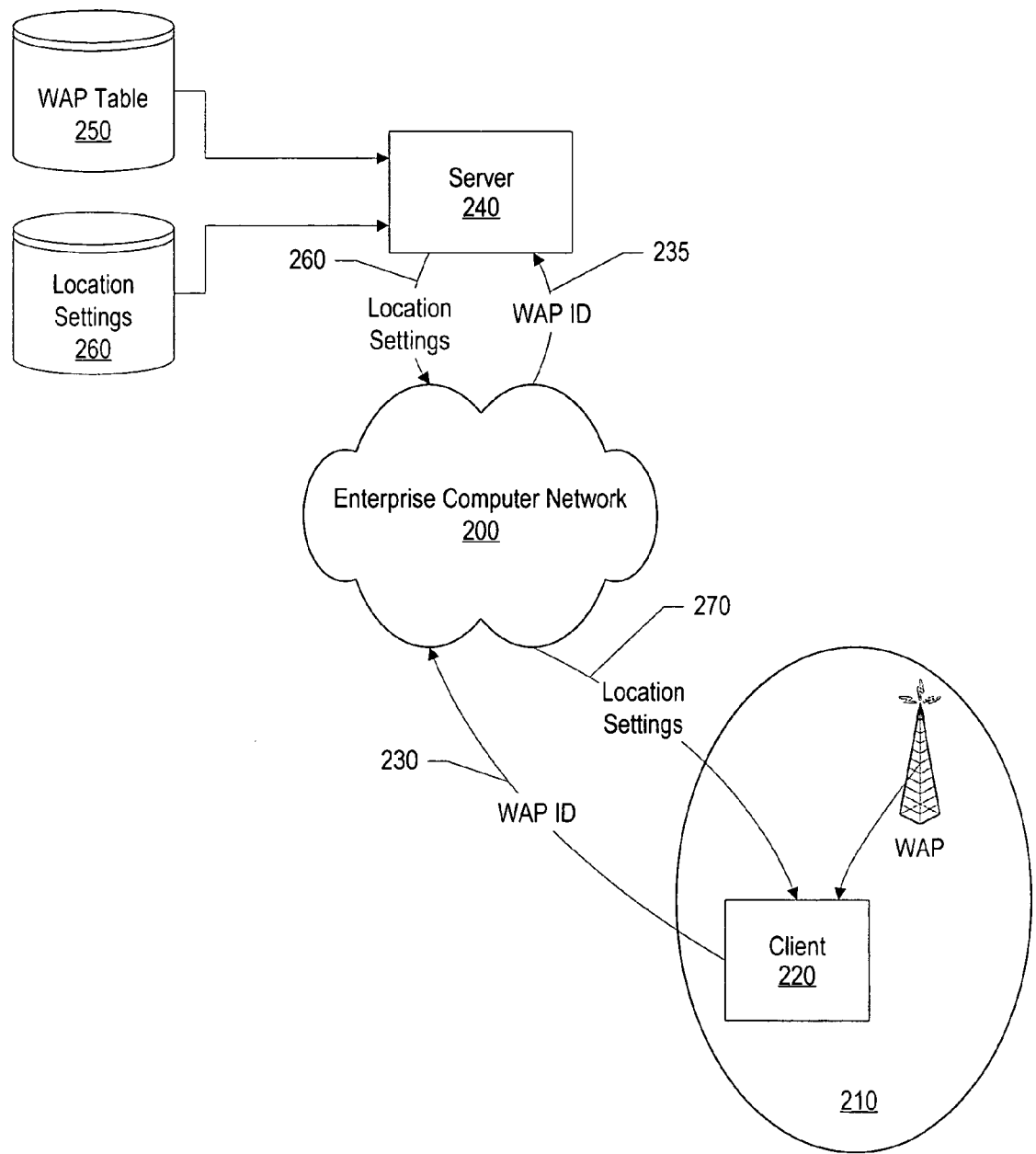
FIG. 2 is a network diagram showing a server locating a client's location based upon the client's wireless network identifier.

FIG. 2 is a network diagram showing a server locating a client's location based upon the client's wireless network identifier. Enterprise computer network 200, such as a company's intranet, interconnects client 220 and server 240. In the example shown, client 220 is in a wireless access zone, or area, 210 that is identified by a wireless access point (WAP) identifier. Client 220 sends WAP identifier 230 through computer network 200, either through the client's wireless or wired connection, and the client's WAP identifier is received by server 240 as WAP ID 235. Server 240 looks up the WAP identifier received from the client in WAP table 250. WAP table 250 is a table of the organizations various WAP zones, identified by the zone's corresponding WAP identifiers, and the physical (i.e., geographic) location to which the zone corresponds. Server 240 retrieves the physical location from WAP table 250 and then uses the retrieved physical location to retrieve location-based settings from data store 260. The retrieved location-based settings are sent by server 240 (transmission 260), through network 200 back to client 220 where they are received by client 220 as location settings 270. Client 220 is then able to apply the location specific settings on the client computing device.

Figure 3:
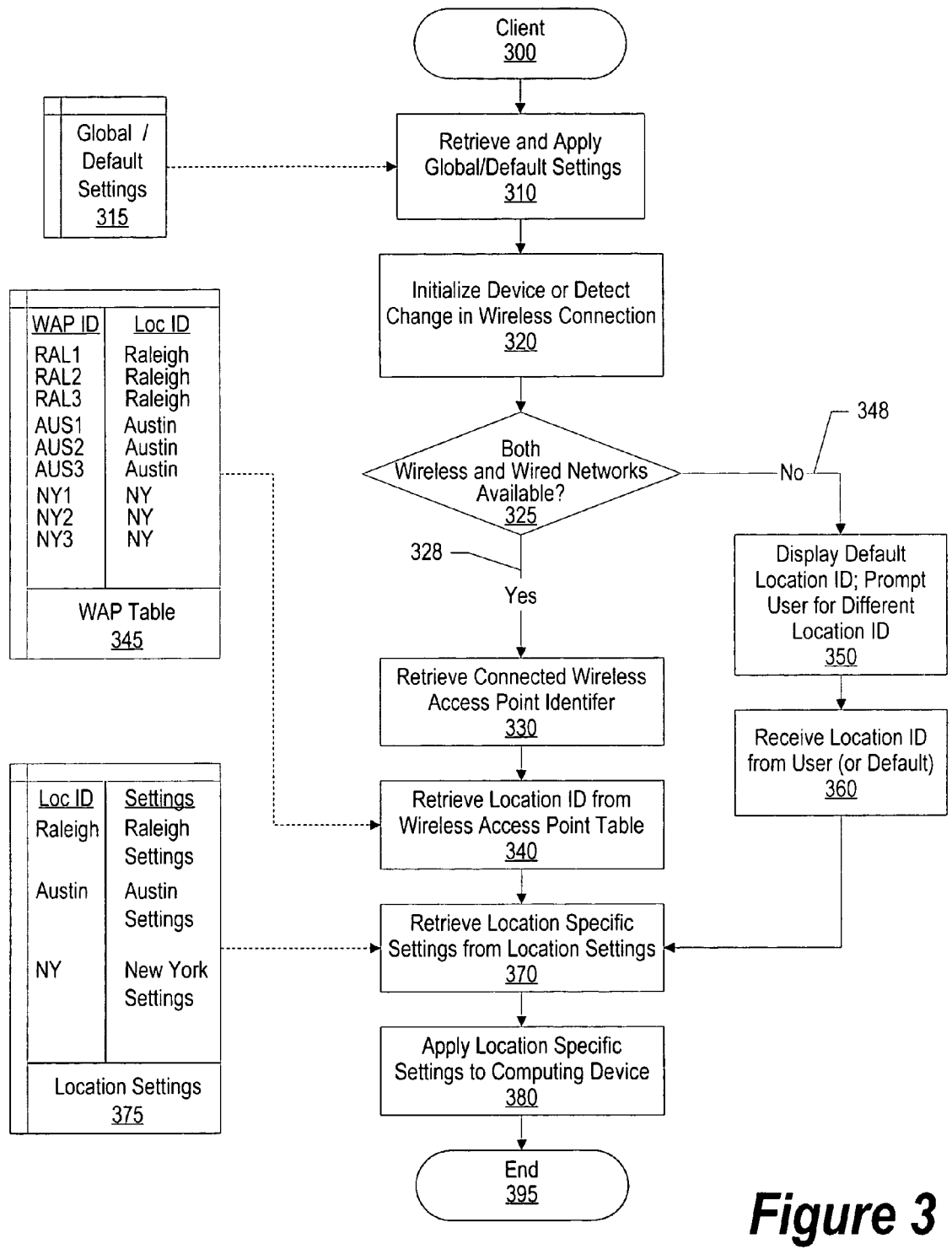
FIG. 3 is a flowchart showing a client determining its location based upon its wireless connection identifier and retrieving location specific settings.

FIG. 3 is a flowchart showing a client determining its location based upon its wireless connection identifier and retrieving location specific settings. Processing commences at 300 whereupon, at step 310, the client retrieves and applies global (i.e., default) settings from data store 315. At step 320, the client's device is initialized or a change is detected in the device's wireless connection. A change in the wireless connection includes a change in the wireless access point to which the device is connected (i.e., when the device is moved from one physical location to another location causing a change in the wireless access point to which the device is connected).

A determination is made as to whether both a wired and a wireless connection to the network is available from the client device (decision 325). If both types of connections are available, decision 325 branches to "yes" branch 328 whereupon automatic retrieval of location data is performed. At step 330, the identifier corresponding to the wireless access point is retrieved. At step 340, the location identifier is retrieved from WAP table 345 based upon the device's WAP identifier. Returning to decision 325, if both wireless and wired network connections are not available (i.e., a wireless connection has not been established), decision 325 branches to "no" branch 348 whereupon, at step 350, the client's default location is displayed and the user is prompted to enter a different location identifier, and at step 360 the location identifier is received from the user (or the user accepts the default location).

At step 370, location based settings are retrieved from location settings table 375 based upon either the automatically retrieved location identifier or the manually inputted location identifier. The retrieved location based settings are then applied to the client computing device at 380. Processing thereafter ends at 395.

Figure 4:
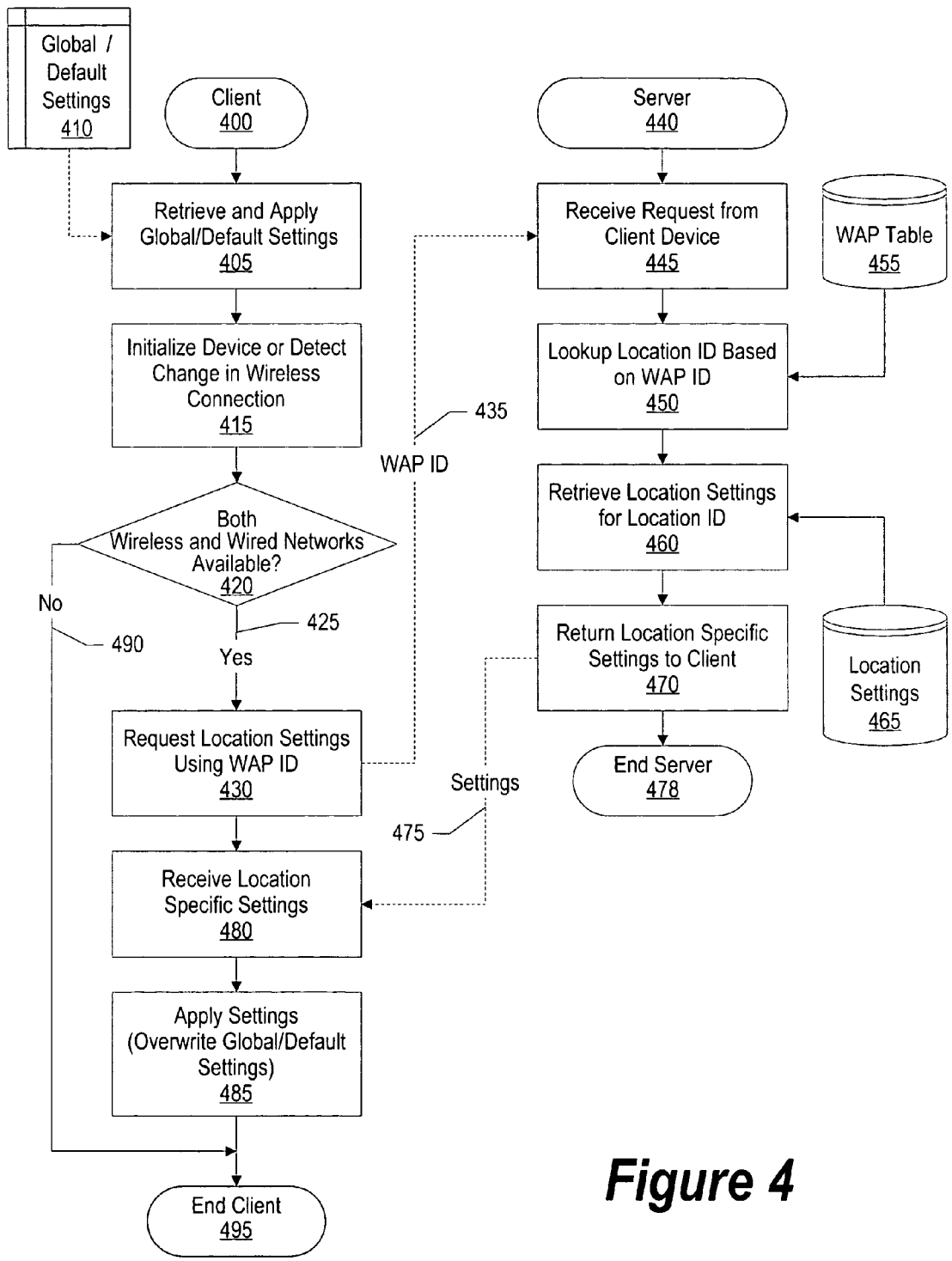
FIG. 4 is a flowchart showing a client-server implementation where the client receives location specific settings from a server based upon the client's location.

FIG. 4 is a flowchart showing a client-server implementation where the client receives location specific settings from a server based upon the client's location. Client processing commences at 400 whereupon, at step 405, the client computing device applies global, or default, settings retrieved from global settings data store 410. At step 415, the client's device is initialized or a change is detected in the device's wireless connection. A change in the wireless connection includes a change in the wireless access point to which the device is connected.

A determination is made as to whether both a wired and a wireless connection to the network is available from the client device (decision 420). If both types of connections are available, decision 420 branches to "yes" branch 425 whereupon automatic retrieval of location data is performed. At step 430, location based settings are requested from a server by sending the client's WAP identifier (435) across the network to the server.

Server processing commences at 440 whereupon, at step 445, the server receives the client's request along with the client's current WAP identifier. At step 450, the server retrieves the location identifier that corresponds to the WAP identifier from WAP table data store 455. At step 460, the server retrieves location based settings that corresponds to the location identifier from location settings data store 465. At step 470, location based settings 475 that were retrieved are sent by the server back to the client over the computer network. Server processing thereafter ends at 478.

Returning to client processing, the client receives location based settings 475 at step 480. The client device then applies the received location specific settings at step 485. Returning to decision 420, if connections to both a wireless and a wired network are not available, then decision 420 branches to "no" branch 490 bypassing steps 430-485. Client processing thereafter ends at 495.

Figure 5:
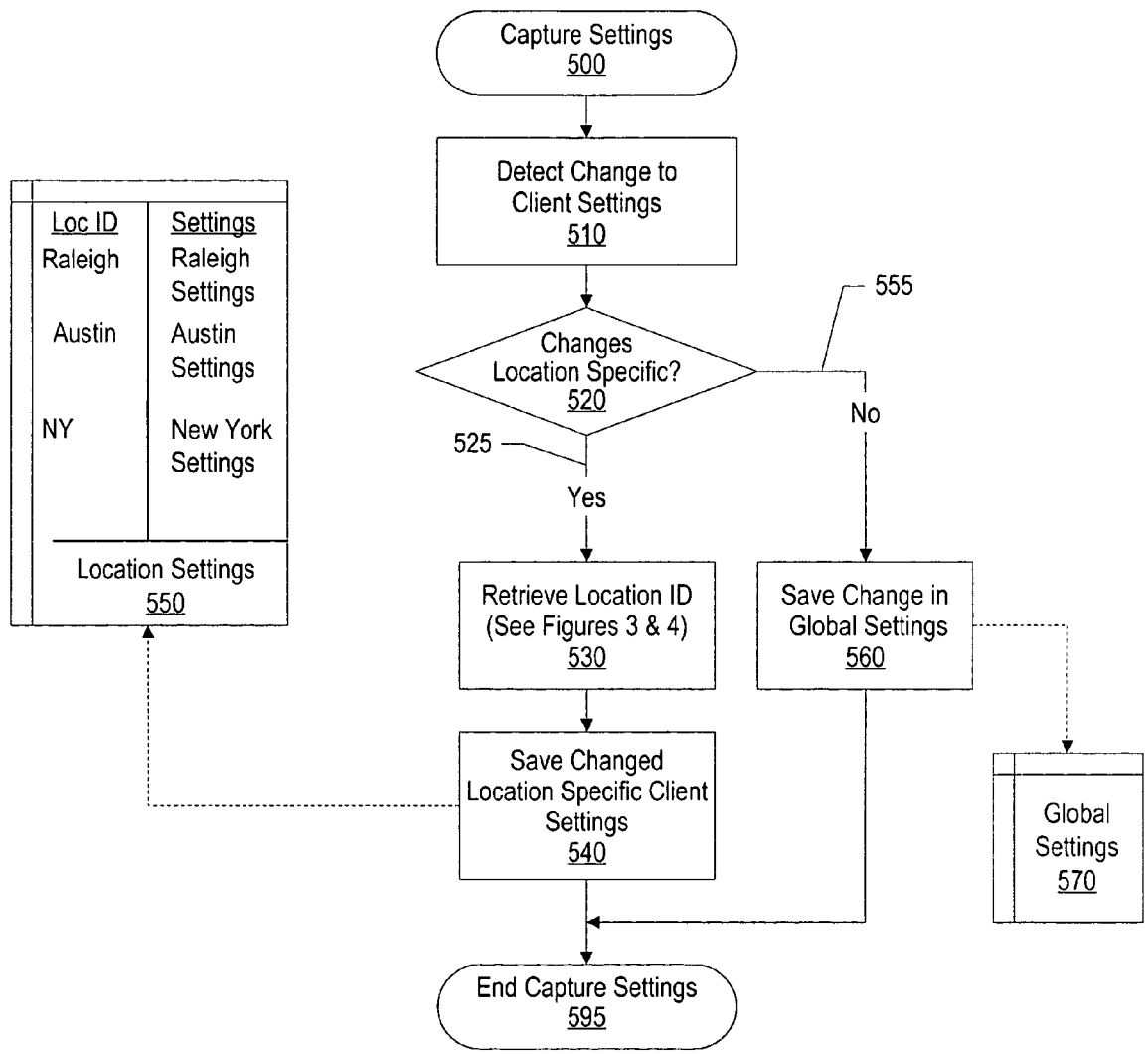
FIG. 5 is a flowchart showing the gathering and storing of location specific settings.

FIG. 5 is a flowchart showing the gathering and storing of location specific settings. Processing commences at 500 whereupon, at step 510, changes to the device's settings are detected. A determination is made as to whether the settings changes that were made are location specific or should be applied at the device regardless of the device's location. If the changes are location specific, decision 520 branches to "yes" branch 525 whereupon, at step 530 the device's location identifier is retrieved using the steps described in FIGS. 3 and 4. At step 540, the location specific settings are saved in location settings data store 550. If a server is being used, the changes are sent to the server and stored in a location settings data store accessible to the server. On the other hand, if a server is not being used, then the location specific settings are stored in a location settings data store accessible to the client device. Capture settings processing thereafter ends at 595.

Returning to decision 520, if the settings that were changed were not location specific, then decision 520 branches to "no"

branch 555 whereupon, at step 560, the changes are saved in global settings data store 570. Capture settings processing thereafter ends at 595.

Figure 6:
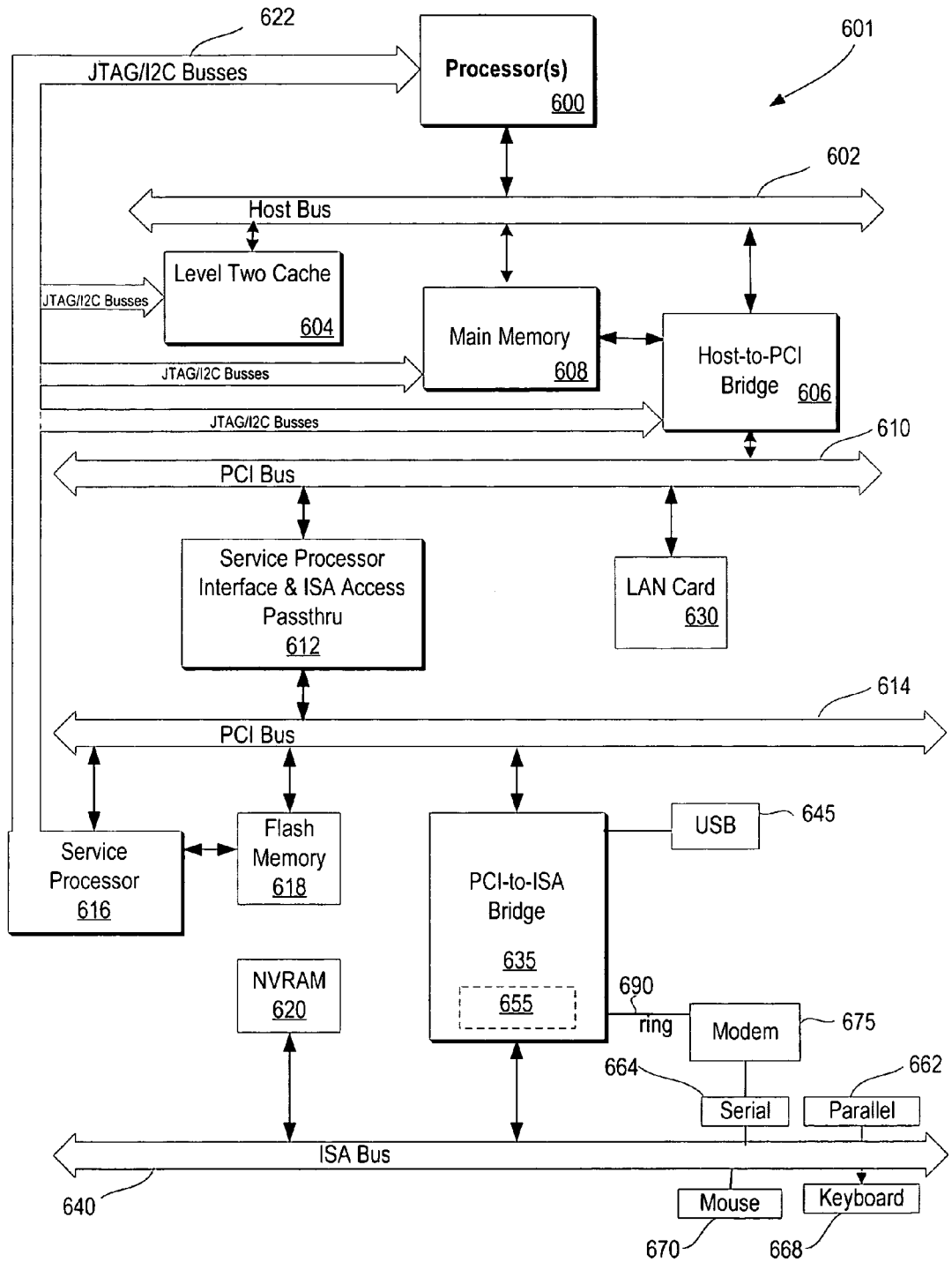
FIG. 6 is a block diagram of a computing device capable of implementing the present invention.

FIG. 6 illustrates information handling system 601 which is a simplified example of a computer system (i.e., an apparatus) capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   retrieving, at a first device, a WAP identifier over a wireless connection corresponding to a wireless access point to which the first device is wirelessly connected;
   identifying, at the first device, a physical location based upon the retrieved WAP identifier;
   determining, at the first device, that the first device is connected to a computer network over at least two separate connections, wherein a first connection is the wireless connection and a second connection is a wired connection;
   in response to determining that the first device is connected to the computer network over at least two separate connections, requesting, by the first device, location specific settings from a second device, wherein the request includes the WAP identifier;
   in response to receiving the request that includes the WAP identifier at the second device, retrieving at the second device the location specific settings that correspond to the WAP identifier from a nonvolatile data store;
   transmitting the location specific settings from the second device to the first device over the wired connection;
   receiving at the first device the location specific settings over the wired connection from the second device that correspond to the identified physical location; and
   applying the location specific settings at the first device.

2. The method of claim 1 further comprising:
   retrieving at the second device a location identifier based upon the WAP identifier included in the request, wherein the location identifier is stored in a first data store accessible from the second device; and
   retrieving at the second device the location specific settings based upon the retrieved location identifier and a client identifier, wherein the location specific settings are stored in a second data store accessible from the second device and wherein the client identifier is included in the request and identifies the first device.

3. The method of claim 1 further comprising:

retrieving, from a first data store, a location identifier based upon the WAP identifier, wherein the location identifier corresponds to the physical location; and retrieving, from a second data store, the location specific settings that correspond to the retrieved location identifier.

4. The method of claim 1 further comprising:

detecting a change to one or more settings used by the first device;

determining that the changed settings are location specific settings;

identifying the first device's physical location in response to the determination based upon the WAP identifier; and associating the location specific settings with the identified physical location.

5. The method of claim 4 further comprising:

retrieving a location identifier that corresponds to the identified physical location; and storing the location identifier and the location specific settings at a nonvolatile storage device accessible from the first device.

6. The method of claim 5 further comprising:

sending the WAP identifier to the second device;

retrieving a location identifier that corresponds to the WAP identifier from a table; and storing a unique identifier corresponding to the first device, the location identifier, and the location specific settings at a nonvolatile storage device accessible from the second device.

7. An apparatus comprising:

one or more processors;

a memory coupled to the processors;

a nonvolatile storage device accessible from the processors;

a wireless network interface for wirelessly connecting the apparatus to a computer network;

software stored in the memory and executed by the processors, the software effective to:

retrieve, at the apparatus, a WAP identifier over a wireless connection corresponding to a wireless access point to which the apparatus is wirelessly connected through the wireless network interface;

identify, at the apparatus, a physical location based upon the retrieved WAP identifier;

determine, at the apparatus, that the apparatus is connected to a computer network over at least two separate connections, wherein a first connection is the wireless connection through the wireless access point and a second connection is a wired connection;

in response to determining that the apparatus is connected to the computer network over at least two separate connections, requesting, by the apparatus, location specific settings from a second apparatus, wherein the request includes the WAP identifier;

in response to receiving the request that includes the WAP identifier at the second apparatus, retrieving at the second apparatus the location specific settings that correspond to the WAP identifier from a nonvolatile data store;

transmitting the location specific settings from the second apparatus to the apparatus over the wired connection;

receive at the apparatus the location specific settings over the wired connection from the second apparatus that correspond to the identified physical location; and apply the location specific settings at the apparatus.

8. The apparatus of claim 7 wherein the software is further effective to:

retrieve at the second apparatus a location identifier based upon the WAP identifier included in the request, wherein the location identifier is stored in a first data store accessible from the second apparatus; and retrieve, at the second apparatus, the location specific settings based upon the retrieved location identifier and a client identifier, wherein the location specific settings are stored in a second data store accessible from the second apparatus and wherein the client identifier is included in the request and identifies the apparatus.

9. The apparatus of claim 7 further comprising software effective to:

retrieve, from a first data store, a location identifier based upon the WAP identifier, wherein the location identifier corresponds to the physical location; and retrieve, from a second data store, the location specific settings that correspond to the retrieved location identifier.

10. The apparatus of claim 7 further comprising software effective to:

detect a change to one or more settings used by the apparatus;

determine that the changed settings are location specific settings;

identify the apparatus' physical location in response to the determination based upon the WAP identifier; and associate the location specific settings with the identified physical location.

11. The apparatus of claim 10 further comprising software effective to:

retrieve a location identifier that corresponds to the identified physical location; and store the location identifier and the location specific settings at a nonvolatile storage device accessible from the apparatus.

12. The apparatus of claim 11 further comprising software effective to:

send the WAP identifier to the second apparatus;

retrieve a location identifier that corresponds to the WAP identifier from a table; and store a unique identifier corresponding to the apparatus, the location identifier, and the location specific settings at a nonvolatile storage device accessible from the second apparatus.

13. A computer readable medium encoded with instructions capable of being executed by a computer which, when executed by the computer, cause the computer to implement a method of configuring location specific settings, the method comprising:

retrieving, at a first device, a WAP identifier over a wireless connection corresponding to a wireless access point to which the first apparatus is wirelessly connected through a wireless network interface;

identifying, at the first apparatus, a physical location based upon the retrieved WAP identifier;

determining, at the first apparatus, that the first apparatus is connected to a computer network over at least two separate connections, wherein a first connection is the wireless connection through the wireless access point and a second connection is a wired connection;

in response to determining that the first device is connected to the computer network over at least two separate connections, requesting, by the first device, location specific settings from a second device, wherein the request includes the WAP identifier;

in response to receiving the request that includes the WAP identifier at the second device, retrieving at the second device the location specific settings that correspond to the WAP identifier from a nonvolatile data store;

transmitting the location specific settings from the second device to the first device over the wired connection;

receiving at the first apparatus the location specific settings over the wired connection from the second apparatus that correspond to the identified physical location; and applying the location specific settings at the first apparatus.

14. The computer readable medium of claim 13 wherein the method further comprises:

retrieving at the second apparatus a location identifier based upon the WAP identifier included in the request, wherein the location identifier is stored in a first data store accessible from the second apparatus; and retrieving, at the second apparatus, the location specific settings based upon the retrieved location identifier and a client identifier, wherein the location specific settings are stored in a second data store accessible from the second apparatus and wherein the client identifier is included in the request and identifies the first apparatus.

15. The computer readable medium of claim 13 wherein the method further comprises:

retrieving, from a first data store, a location identifier based upon the WAP identifier, wherein the location identifier corresponds to the physical location; and retrieving, from a second data store, the location specific settings that correspond to the retrieved location identifier.

16. The computer readable medium of claim 13 wherein the method further comprises:

detecting a change to one or more settings used by the first apparatus;

determining that the changed settings are location specific settings;

identifying the first apparatus' physical location in response to the determination based upon the WAP identifier; and associating the location specific settings with the identified physical location.

17. The computer readable medium of claim 16 wherein the method further comprises:

retrieving a location identifier that corresponds to the identified physical location; and storing the location identifier and the location specific settings at a nonvolatile storage device accessible from the first apparatus.

18. The computer readable medium of claim 17 wherein the method further comprises:

sending the WAP identifier to the second apparatus;

retrieving a location identifier that corresponds to the WAP identifier from a table; and storing a unique identifier corresponding to the first apparatus, the location identifier, and the location specific settings at a nonvolatile storage device accessible from the second apparatus.

* * * * *